United States Patent [19]
Usami

[11] Patent Number: 5,283,655
[45] Date of Patent: Feb. 1, 1994

[54] VIDEO CAMERA APPARATUS HAVING SOLID STATE IMAGER

[75] Inventor: Makoto Usami, Kanagawa, Japan

[73] Assignee: Sony Corporation, Tokyo, Japan

[21] Appl. No.: 944,952

[22] Filed: Sep. 15, 1992

[30] Foreign Application Priority Data

Sep. 30, 1991 [JP] Japan .................. 03-250709

[51] Int. Cl.⁵ .................. H04N 3/14; H04N 5/335
[52] U.S. Cl. .................. 348/257; 368/229; 368/251; 368/298
[58] Field of Search .................. 358/228, 213.16, 171, 358/213.13, 221

[56] References Cited

U.S. PATENT DOCUMENTS

| | | | |
|---|---|---|---|
| 4,274,107 | 6/1981 | Tamura et al. | 358/29 |
| 4,556,912 | 12/1985 | Yamanaka et al. | 358/213 |
| 4,589,025 | 5/1986 | Monahan et al. | 358/213 |
| 4,631,589 | 12/1986 | Hongu et al. | 358/171 |
| 4,675,738 | 6/1987 | Okino et al. | 358/167 |
| 4,723,170 | 2/1988 | Jaspers | 358/221 |
| 4,786,969 | 11/1988 | Shouji et al. | 358/171 |
| 4,959,727 | 9/1990 | Imaide et al. | 358/228 |
| 4,963,982 | 10/1990 | Hieda | 358/213.18 |
| 4,972,267 | 11/1990 | Kaneko et al. | 358/213.22 |
| 5,049,997 | 9/1991 | Arai | 358/213.11 |

FOREIGN PATENT DOCUMENTS

| | | |
|---|---|---|
| 152496 | 8/1985 | European Pat. Off. |
| 240937 | 10/1987 | European Pat. Off. |
| 54-76014 | 6/1979 | Japan |
| 2-057072 | 2/1990 | Japan |

*Primary Examiner*—Michael T. Razavi
*Assistant Examiner*—Joseph Colaianni
*Attorney, Agent, or Firm*—William S. Frommer; Alvin Sinderbrand

[57] ABSTRACT

A video camera apparatus having a solid state imager for generating video signals and a black level balance adjusting circuit for automatically adjusting black levels of the video signals. The video camera apparatus comprises an incident light control device, an electronic shutter control circuit, a comparator and a processor. The incident light control device controls the amount of light incident to the solid state imager. The electronic shutter control circuit varies the mode of the solid state imager between at least a first mode and a second mode. The effective accumulating period of the solid state imager in the first mode is different from the corresponding period in the second mode. The comparator compares the voltage level of the video signal obtained in the first mode with that obtained in the second mode. The processor controls the electronic shutter control circuit and the comparator, and activates the black level balance adjusting circuit when the voltage levels of the video signals obtained in the first and the second modes are substantially the same.

9 Claims, 3 Drawing Sheets

VIDEO CAMERA APPARATUS HAVING SOLID STATE IMAGER

BACKGROUND OF THE INVENTION

1. Field of the Invention

The present invention relates to a solid state imager for use in such video camera apparatuses as the CCD video camera and, more particularly, to an automatic black balance adjusting circuit for adjusting black balances of video signals when incident light to the solid state imager is substantially nil.

2. Description of the Prior Art

Imaging devices utilizing the solid state image detector such as a CCD (charge coupled device) are generally called solid state imagers. Conventional solid state imagers are known sometimes to develop coloring or irregular brightness in black portions of video images that they produce. This phenomenon stems from black imbalance of video signals. The imbalance, leading to image quality deterioration, is attributable to changes in the temperature characteristics of the solid state image detector as well as in the color temperature of incident light to the image detector. One solution to the deterioration in image quality is a black balance adjusting circuit provided in the solid state imager.

FIG. 3 shows a conventional black balance adjusting circuit contained in the solid state imager disclosed in Japanese Patent Laid-Open No. 63-14554. In FIG. 3, a luminance signal Y fed from a matrix circuit 23 is turned to a control signal by an amplifier circuit 30. The control signal is sent via a resistor 31 and an output terminal 32 to a servo circuit, not shown. Given the control signal, the servo circuit drives an iris motor, not shown, for automatic iris control.

Meanwhile, three primary color signals R, G and B are supplied to the matrix circuit 23 which in turn generates the luminance signal Y and color signals I and Q. The signals R and B are controlled for gain by AGC circuits 21 and 22 so as to reach necessary levels with respect to the signal G. After undergoing gain control, the signals R and B become signals R' and B' that are input to the matrix circuit 23.

The process of gain control takes place as follows: The AGC circuit under control of a memory circuit 26 amplifies the signal R into the signal R' for output to an amplifier 24. The amplifier 24 supplies the memory circuit 26 with an error signal representing the error of the signal R' with respect to the signal G. Based on the information stored in it, the memory circuit 26 outputs to the AGC circuit 21 a gain control signal corresponding to the error signal. Likewise, the AGC circuit 22 under control of a memory circuit 27 amplifies the signal B into the signal B' for output to an amplifier 25. The amplifier 25 supplies the memory circuit 25 with an error signal representing the error of the signal B' with respect to the signal G. Based on the information stored in it, the memory circuit 27 outputs to the AGC circuit 22 a gain control signal corresponding to the error signal. In this manner, the signals R and B are turned respectively into the signals R' and B' at required levels with respect to the signal G for gain control.

Setting a switch 34 to the side of a terminal 34b initiates black balance adjustment and updates gain control information. Specifically, when the switch 34 is set to the terminal 34b side for black balance adjustment, a terminal 34c is connected to ground and the servo circuit is supplied via the output terminal 32 with the control signal clamped substantially to ground voltage by a diode 33. The control signal causes the servo circuit to close the iris in order to shut off incident light. After a predetermined time based on the iris operating time has elapsed, a time constant circuit 35 brings terminals K of the memory circuits 26 and 27 to ground potential. The memory circuits 26 and 27 enter write mode. The gain control information in the memory circuit 26 is updated according to the error signal representing the error of the signal R' with respect to the signal G during incident light shutoff. Similarly, the gain control information in the memory circuit 27 is updated based on the error signal representing the error of the signal B' with respect to the signal G during incident light shutoff.

As described, automatic black balance adjustment is carried out conventionally on the basis of the signal levels of the three primary color signals R, G and B in effect upon complete incident light shutoff. It follows that precise detection of the state of complete incident light shutoff is very important in executing the function.

With three-plate CCD video cameras, optical black level signals derived from the CCD's for the respective colors are timed to set pedestal levels of video signals. Black levels of video signals are set according to the levels (i.e., noise levels) of the three primary color signals R, G and B in effect during complete incident light shutoff. These noise levels vary significantly depending on the difference in characteristics between the CCD's as well as on the temperature characteristics such as dark current. Thus it is difficult to detect the state of complete incident light shutoff through attempts to detect such noise levels. As a result, conventional solid state imagers sometimes start automatic black balance adjustment while the iris is being closed halfway.

In executing automatic black balance adjustment, the above-mentioned prior art solid state imager takes advantage of the fact that it takes the automatic iris about 1.5 seconds going from activation to complete light shutoff. That is, automatic black balance adjustment is arranged to be started about two seconds after operation of the switch 34. In other words, the prior art example substitutes the delayed action of the time constant circuit 35 for the detection of complete incident light shutoff based on signal levels. This means that correct black balance adjustment is not always achieved where the automatic iris works poorly or where a manual iris C-mount lens is utilized.

SUMMARY OF THE INVENTION

It is therefore an object of the present invention to provide a solid state imager which accurately detects the state of complete incident light shutoff based on the change in signal levels between two different electronic shutter speeds before automatic black balance adjustment is started.

In carrying out the invention and according to one aspect thereof, there is provided a video camera apparatus having a solid state imager for generating video signals and a black level balance adjusting circuit for automatically adjusting black levels of the video signals, the video camera apparatus comprising: incident light control device for controlling the amount of light incident to the solid state imager; an electronic shutter control circuit for varying the mode of the solid state imager between at least a first mode and a second mode, the effective accumulating period of the solid state imager in the first mode being different from the corresponding period in the second mode; a comparator for comparing the voltage level of the video signal obtained in the first mode with that obtained in the second mode; and processing means for controlling the electronic shutter control circuit and the comparator, and for activating the black level balance adjusting circuit when the voltage levels of the video signals obtained in the first and the second modes are substantially the same.

According to another aspect of the invention, there is provided an apparatus for detecting no light incidence to a solid state imager, comprising: an electronic shutter control circuit for controlling the effective accumulating period of the solid state imager; an electronic shutter control circuit for varying the solid state imager between at least a first mode and a second mode, the effective accumulating period of the solid state imager in the first mode being different from the corresponding period in the second mode; a comparator for comparing the voltage level of the video signal obtained in the first mode with that obtained in the second mode so as to acquire the difference between the voltage levels of the video signals obtained in the first and the second modes; and a detector for detecting the no-light incidence when the difference between the voltage levels of the video signals is less than a predetermined voltage level.

According to a further aspect of the invention, there is provided a method for detecting light incidence to a solid state imager, the effective accumulating period of the solid state imager been controlled by an electronic shutter control circuit, the method comprising the steps of: obtaining the voltage level of a video signal derived from the solid state imager in a first effective accumulating period; obtaining the voltage level of a video signal derived from the solid state imager in a second effective accumulating period which is different from the first effective accumulating period; obtaining the difference between voltage levels of the video signals obtained in the first and the second effective accumulating periods; and detecting light incidence when the difference between the voltage levels of the video signals is less than a predetermined voltage.

When thus embodied, the invention accurately detects the state of complete incident light shutoff based on the change in signal levels between two different electronic shutter speeds before automatic black balance adjustment is started. This makes it possible not only to achieve black balance adjustment in the state of complete incident light shutoff but also to warn of the occurrence of states wherein incident light is incompletely shut off.

These and other objects, features and advantages of the invention will become more apparent upon a reading of the following description and appended drawings.

DESCRIPTION OF THE PREFERRED EMBODIMENT

Figure 1:
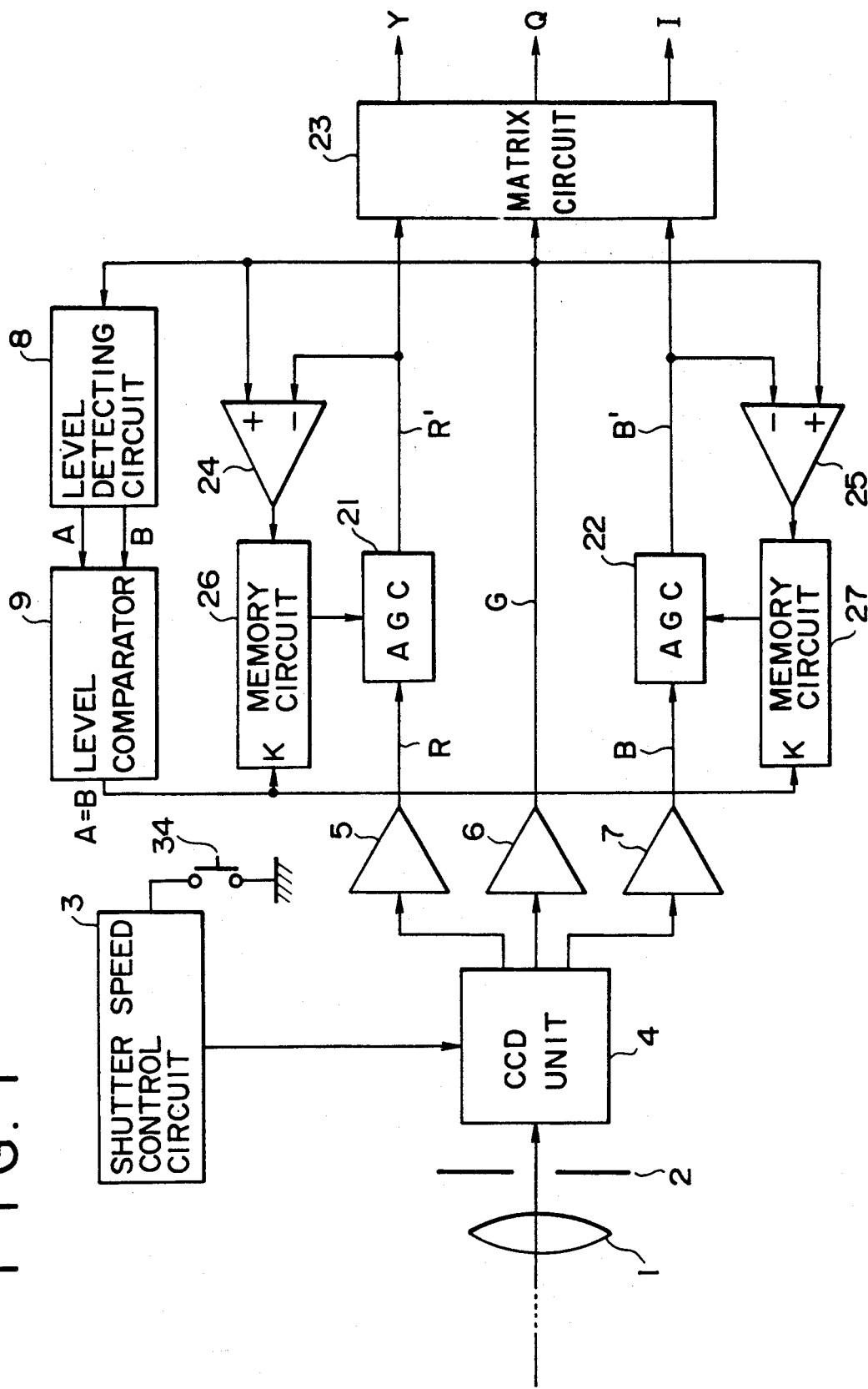
FIG. 1 is a block diagram of a solid state imager embodying the present invention.
Figure 3:
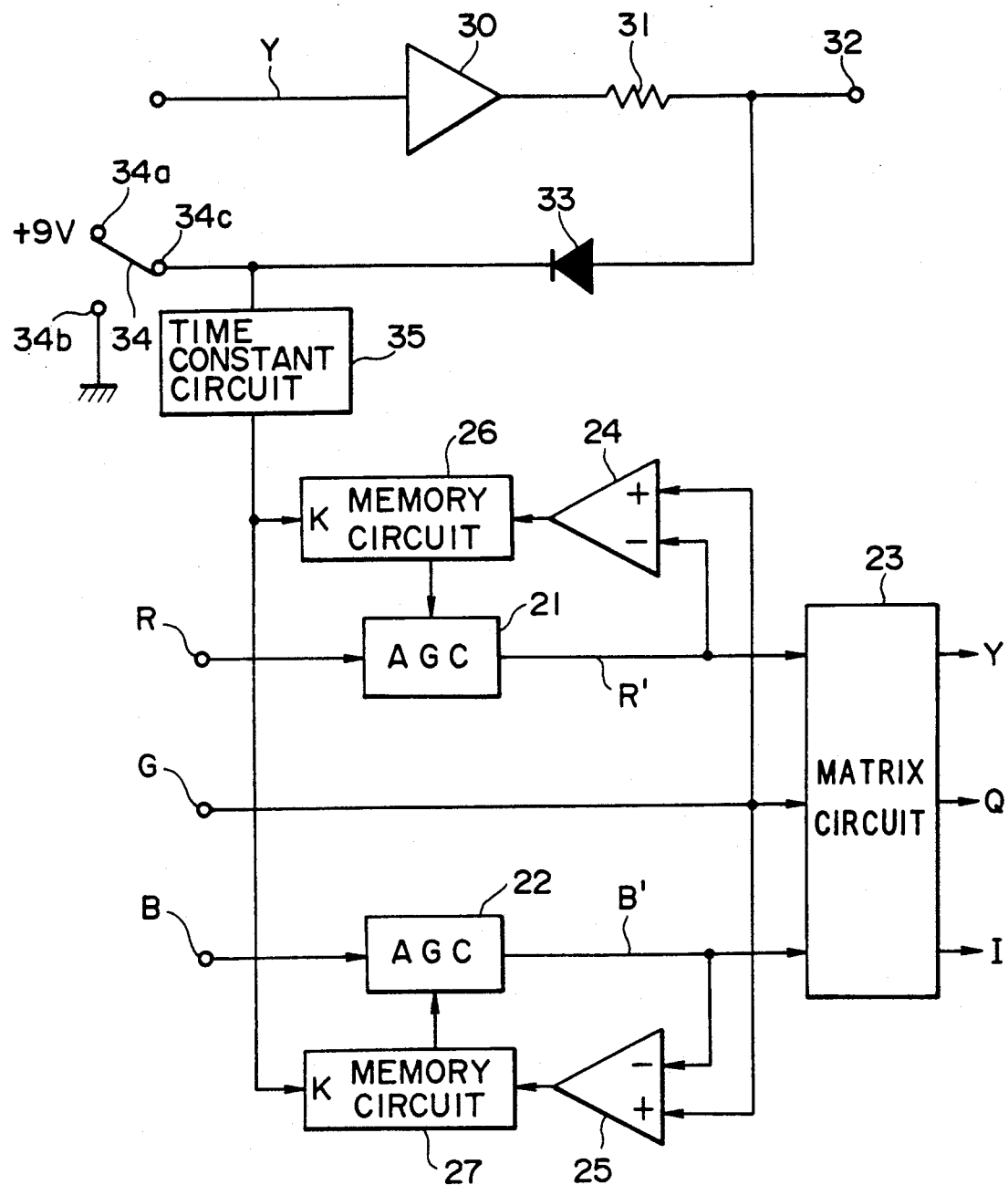
FIG. 3 is a block diagram of a typical prior art solid state imager.

One preferred embodiment of the invention will now be described with reference to the accompanying drawings. FIG. 1 is a block diagram of the embodiment of the invention, and FIG. 3 is a block diagram of the typical prior art solid state imager. In FIGS. 1 and 3, like reference characters designate like or corresponding parts, with any repetitive description thereof omitted. The embodiment is a solid state imager incorporating a three-plate CCD unit 4 made of a color separation optical system and three CCD'S.

In FIG. 1, when a switch 34 is pushed to initiate automatic black balance adjustment, an iris motor (not shown) drives an automatic iris 2 to shut off incident light coming in through a lens 1. Where the iris is a manual type, the incident light is shut off by completely closing the iris by hand or by capping the lens 1.

With the incident light shut off, a shutter speed control circuit 3 sets the CCD unit 4 at a first shutter speed of, say, 1/60 sec. That is, the CCD unit 4 is set to a first charge accumulating period of 1/60 sec., and three primary color signals R, G and B are output respectively through preamplifiers 5, 6 and 7 at the first shutter speed. A level detecting circuit 8 receives the signal G at the first shutter speed (1/60 sec.) and detects the signal level thereof. The detected signal level is output as a first level A to a level comparator 9.

The shutter speed control circuit 3 then sets the CCD unit 4 at a second shutter speed of, say, 1/1000 sec. The level detecting circuit 8 detects the signal level of the signal G at the second shutter speed (1/1000 sec.). The signal level thus detected is output as a second level B to the level comparator 9.

In the state of complete incident light shutoff, the first and the second levels A and B become substantially the same because they are noise levels independent of charge accumulating Periods. In that case, the level comparator 9 outputs a low-level match signal A=B to memory circuits 26 and 27. The low-level match signal A=B causes the memory circuits 26 and 27 to enter write mode. In write mode, black balance adjustment is executed and the gain control information in the memory circuits 26 and 27 is updated.

Updating of the gain control information is carried out in the same manner as with the prior art example. That is, terminals K of the memory circuits 26 and 27 are initially brought Low so that the two circuits will enter write mode. The signal R in effect upon complete incident light shutoff is turned into a signal R' by an AGC circuit 21 before being output to an amplifier 24. The amplifier 24 supplies the memory circuit 26 with an error signal representing the error of the signal R with respect to the signal G. Based on the error signal, the memory circuit 26 updates the main control information about the signal R. Likewise, the signal B in effect upon complete incident light shutoff is turned into a signal B' by an AGC circuit 22 before being output to an amplifier 25. The amplifier 24 furnishes the memory circuit 27 with an error signal representing the error of the signal B' with respect to the signal G. Based on the error signal, the memory circuit 27 updates the gain control information about the signal B.

If a state of incomplete incident light shutoff has occurred for some reason, the first and the second levels A and B become different signal levels depending on the charge accumulating period in effect. The level comparator 9 outputs a high-level mismatch signal A≠B that keeps the memory circuits 26 and 27 in write mode. Black balance adjustment is not carried out, and the gain control information in the memory circuits 26 and 27 is not updated. An in-finder indication or an alarm beep warns of the state of incomplete incident light shutoff. Incomplete shutoff of incident light is typically caused by malfunction of the automatic iris 2, by inadvertent operation of a manual iris or by poor mounting of a lens cap.

In the embodiment described, the shutter speed control circuit 3, level detecting circuit 8, level comparator 9 and memory circuits 26 and 27 are implemented illustratively using a microcomputer installed in the solid state imager as its controller.

Figure 2:
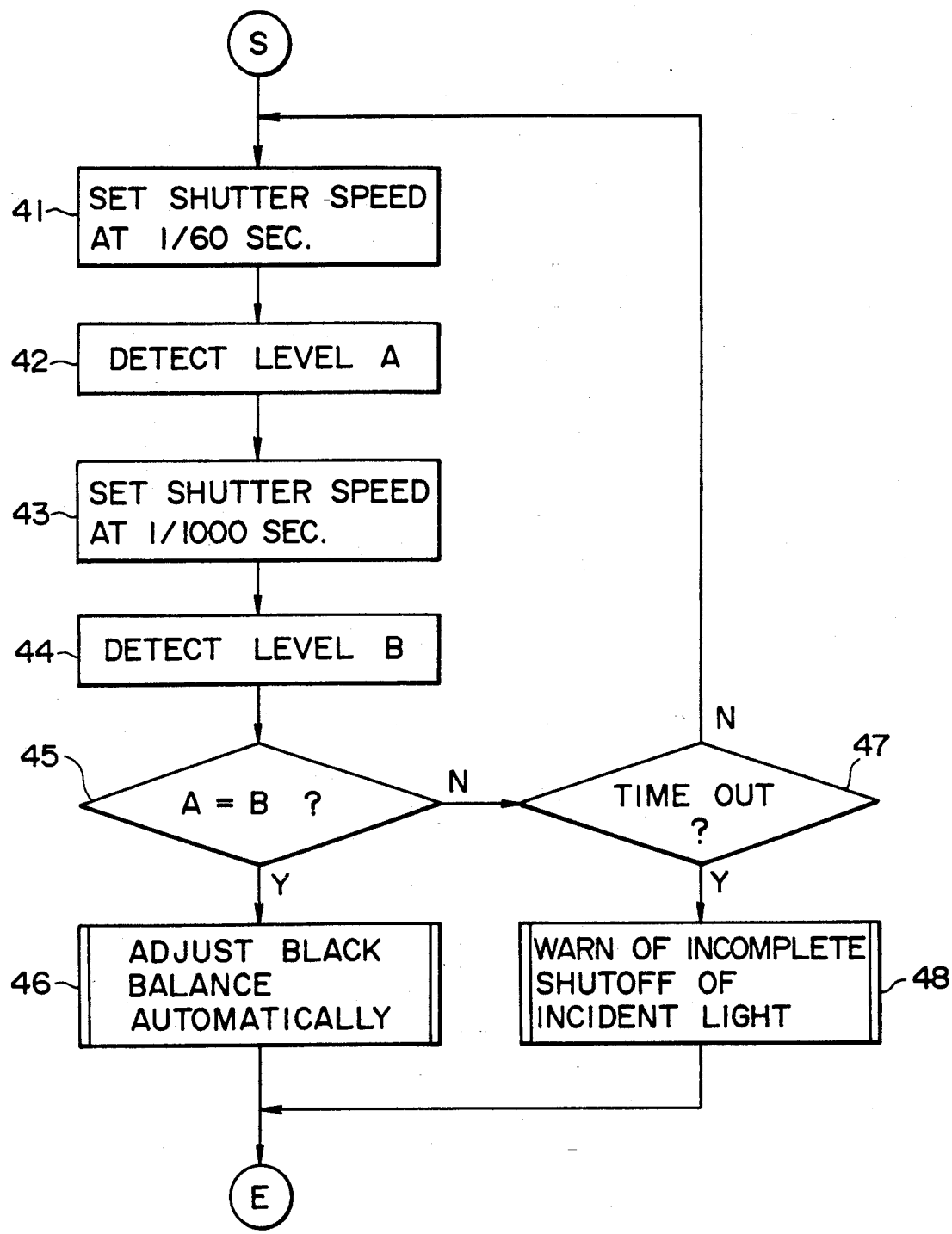
FIG. 2 is a flowchart of steps in which the embodiment of FIG. 1 operates.

FIG. 2 is a flowchart of steps in which the abovementioned microcomputer operates to detect the state of complete incident light shutoff. As shown in FIG. 2, pushing the switch 34 for automatic black balance adjustment initiates step 41. Step 41 causes the shutter speed control circuit 3 to set an electronic shutter at a first speed (e.g., "off"). With the electronic shutter speed set at off, the charge accumulating period becomes equal to the field period, i.e., to 1/60 sec. under the NTSC system. The optical charge accumulated in the CCD unit 4 is read out at the first shutter speed. The charge thus read is fed as the signal G to the level detecting circuit 8 through the preamplifier 6. In turn, the level detecting circuit 8 detects, in step 42, the signal level of the incoming signal G at the first shutter speed (1/60 sec.). The detected level is output as the first level A to the level comparator 9.

In step 43, the shutter speed control circuit 3 sets the electronic shutter at a second shutter speed (e.g., 1/1000 sec.) which is different from the first speed. When the electronic shutter speed is set, the charge accumulating period of the CCD unit 4 is controlled in units of horizontal scanning periods H (63.5 $\mu$s each) and up to the field period. Since the period of 1/1000 sec. corresponds to 15.7 H under the NTSC system, the charge accumulating period of the above case is controlled to 16 H. The optical charge accumulated in the CCD unit 4 is read out therefrom at the second shutter speed. The charge thus read is supplied as the signal G to the level detecting circuit 8 through the preamplifier 6. The level detecting circuit 8 detects, in step 44, the signal level of the incoming signal G at the second shutter speed (1/1000 sec.). The detected signal level is output as the second level B to the level comparator 9.

In the state of complete incident light shutoff, the first and the second levels A and B become substantially the same because they are noise levels independent of the charge accumulating period. In case of incomplete shutoff of incident light, the first and the second signal levels A and B differ from each other depending on the charge accumulating period (A>B). In step 45, the level comparator 9 compares the levels A and B. If the level difference is found to be less than a predetermined threshold value, the low-level match signal A=B is output to the memory circuits 26 and 27. If the level difference between the levels A and B is greater than the predetermined threshold value, the level comparator 9 outputs the high-level mismatch signal A×B to the memory circuits 26 and 27. The threshold value set to the level comparator 9 is illustratively half of the difference between pedestal level and black level.

If the level comparator 9 outputs the low-level match signal A=B, step 46 is reached. In step 46, the terminals K of the memory circuits 26 and 27 are brought Low, automatic black balance adjustment is started, and the gain control information in the memory circuits 26 and 27 is updated as with the prior art example. If the level comparator 9 outputs the high-level mismatch signal A≠B, step 47 is reached. In step 47, a check is made to see if time has run out on a predetermined period. That predetermined period is set at, say, two seconds depending on the response speed of the automatic iris adjusting mechanism.

If time has yet to run out in step 47 on the predetermined period, step 41 is again reached from which the subsequent steps are repeated. If time has run out on the predetermined period in step 47, step 48 is reached in which a state of incomplete shutoff of incident light to the CCD unit 4 is recognized. In that case, automatic black balance adjustment is halted, and an in-finder indication or an alarm beep is used to warn of the state of incomplete incident light shutoff.

Because the state of complete incident light shutoff is accurately identified before automatic black balance adjustment takes place, the levels of the primary color signals R' and B' fed to the matrix circuit 23 via the AGC circuits 21 and 22 are controlled to appropriate levels with respect to the primary color signal G.

Although the embodiment discussed above is a three-plate type imager, the invention may also be applied to single-plate and double-plate type imagers.

In the above-described embodiment, the two electronic shutter speeds are set at 1/60 and 1/1000 seconds for detecting the state of incident light shutoff. Alternatively, any other two different shutter speeds may be adopted.

The embodiment above utilizes the signal G as the primary color signal with respect to which the state of incident light shutoff is determined. Alternatively, another other primary color signal or the sum of multiple primary color signals may be utilized for the purpose.

As described, the invention when embodied accurately detects the state of complete incident light shutoff based on the chance in signal levels between two different electronic shutter speeds before automatic black balance adjustment is started. This makes it possible not only to achieve black balance adjustment in the state of complete incident light shutoff but also to warn of the occurrence of states wherein incident light is incompletely shut off.

While a preferred embodiment of the invention has been described using specific terms, such description is for illustrative purposes only, and it is to be understood that changes and variations may be made without departing from the spirit or scope of the following claims.

What is claimed is:
1. A video camera apparatus comprising:
variable mode solid state imaging means for generating video signals and having an effective accumulating period, said video signals having voltage levels which are a function of the accumulating period,
black level balance adjusting means for automatically adjusting black levels of said video signals;
incident light control means for controlling the amount of light incident to said solid state imaging means;
electronic shutter control means for varying the mode of said solid state imaging means between at least a first mode and a second mode, the effective accumulating period of said solid state imaging means in said first mode being of different temporal duration than the effective accumulating period in said second mode;

comparator means for comparing the voltage level of the video signal obtained in said first mode with that obtained in said second mode; and processing means for controlling said electronic shutter control means and said comparator means, and for activating said black level balance adjusting means when the voltage levels of said video signals obtained in said first and said second modes are substantially the same.

2. A video camera apparatus according to claim 1, wherein said incident light control means is a mechanical iris which can be operated automatically.

3. A video camera apparatus according to claim 1, wherein said processing means activates said black level balance adjusting means when the difference between the voltage levels of said video signals obtained in said first and said second modes is less than a predetermined voltage level.

4. A video camera apparatus according to claim 1, wherein said said electronic shutter control means repeats the varying of the mode of said solid state imaging means between said first mode and said second mode when the voltage levels of said video signals obtained in said first mode and those obtained in said second mode are not substantially the same.

5. A video camera apparatus according to claim 4, further including means for activating said processing means.

6. A video camera apparatus according to claim 5, wherein said processing means stops controlling said electronic shutter control means and said comparator means when a predetermined time has elapsed after activation of said processing means.

7. A video camera apparatus according to claim 6, further comprising means for indicating warning information when said predetermined time has elapsed after activation of said processing means.

8. An apparatus for detecting an absence of light incident on a solid state imaging means having an effective accumulating period and having different operating modes, said apparatus comprising:

electronic shutter control means for controlling the effective accumulating period of said solid state imaging means and for varying the mode of said solid state imaging means between at least a first mode and a second mode, the effective accumulating period of said solid state imaging means in said first mode being of different temporal duration than the corresponding period in said second mode such that said solid state imaging means produces video signals having voltage levels which are a function of the accumulating period;

a comparator means for comparing the voltage level of the video signal obtained in said first mode with that obtained in said second mode so as to produce a difference between the voltage levels of the video signals obtained in said first and second modes; and means for detecting the absence of incident light when the difference between the voltage levels of said video signals is less than a predetermined voltage level.

9. A method for detecting an absence of light incident on a solid state imaging means having an effective accumulating period controlled by electronic shutter control means, said method comprising the steps of:

generating a voltage level of a video signal derived from said solid state imaging means in a first effective accumulating period;

generating a voltage level of a video signal derived from said solid state imaging means in a second effective accumulating period which is of different temporal duration than said first effective accumulating period;

producing a difference between voltage levels of the video signals obtained in said first and said second effective accumulating periods; and detecting the absence of incident light when the difference between the voltage levels of said video signals is less than a predetermined voltage.

* * * * *